United States Patent [19]

Price

[11] 4,322,294
[45] Mar. 30, 1982

[54] APPARATUS FOR REMOVING OIL AND DEBRIS FROM WATER

[76] Inventor: Larry D. Price, 2962 Demetropolis Rd., Mobile, Ala. 36609

[21] Appl. No.: 194,031

[22] Filed: Oct. 6, 1980

Related U.S. Application Data

[63] Continuation-in-part of Ser. No. 62,675, Aug. 1, 1979, abandoned.

[51] Int. Cl.³ ............................................. E02B 15/04
[52] U.S. Cl. .................................. 210/242.3; 210/540
[58] Field of Search .................... 210/801, 242 S, 923, 210/540

[56] References Cited

U.S. PATENT DOCUMENTS

| 3,613,891 | 10/1971 | Cloutier | 210/242 S |
| 3,630,376 | 12/1971 | Price | 210/242 S |
| 3,700,108 | 10/1972 | Richards | 210/242 |
| 3,762,558 | 10/1973 | Anderson | 210/242 |
| 3,966,615 | 6/1976 | Petchel et al. | 210/923 |
| 4,061,569 | 12/1977 | Bennett et al. | 210/923 |

*Primary Examiner*—Theodore A. Granger
*Attorney, Agent, or Firm*—Leo J. Aubel; Ralph R. Rath

[57] ABSTRACT

Apparatus is disclosed for removing oil, floating debris, and other waste matter floating on the surface of a body of water.

4 Claims, 7 Drawing Figures

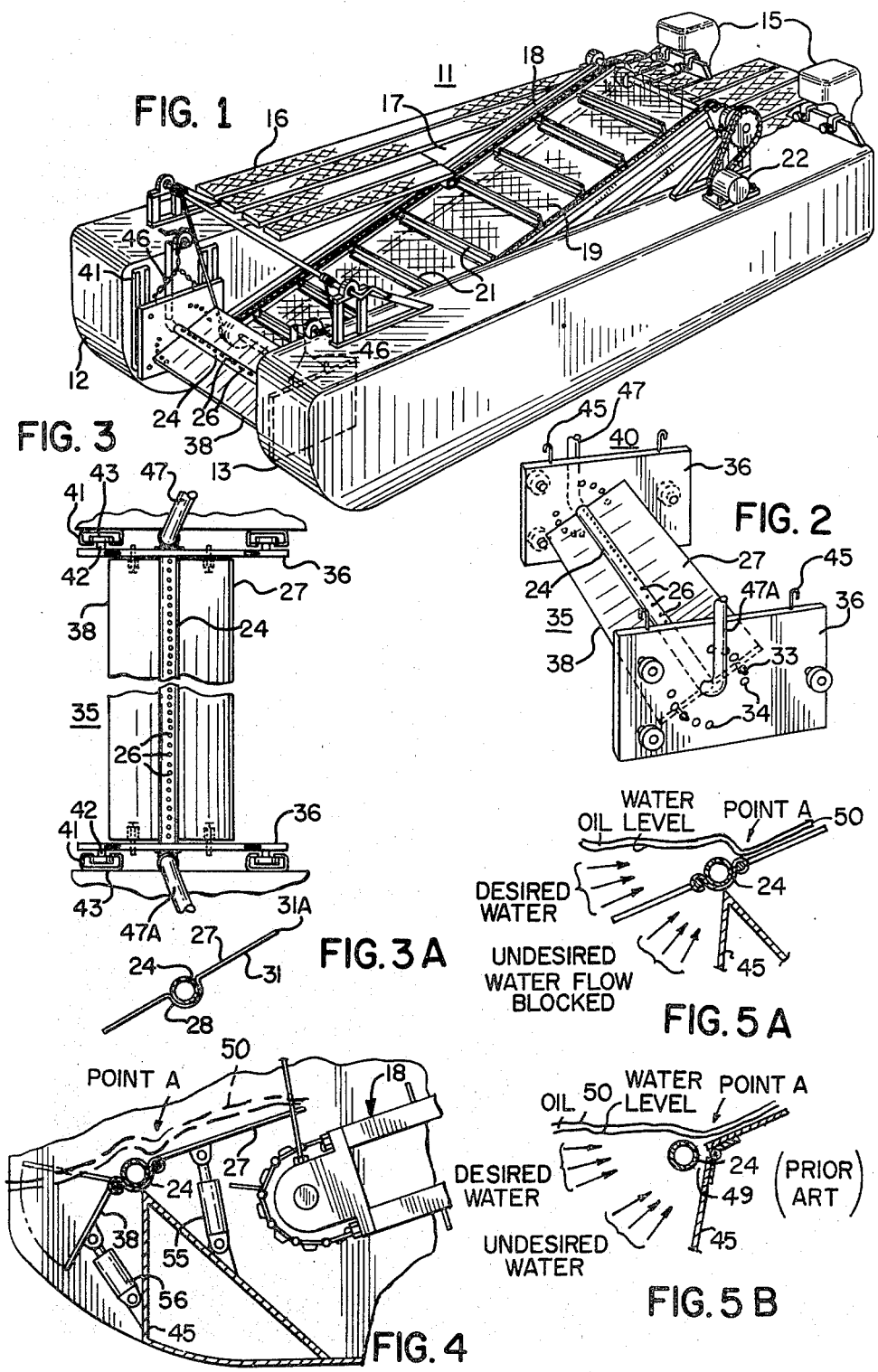

4,322,294

APPARATUS FOR REMOVING OIL AND DEBRIS FROM WATER

REFERENCE TO RELATED APPLICATION

This application is a continuation-in-part of application Ser. No. 62,675 filed Aug. 1, 1979, now abandoned under the same title and in the name of the same inventor, Larry D. Price.

BACKGROUND OF INVENTION

This application discloses subject matter related to the subject matter of U.S. Pat. No. 3,630,376 entitled Oil Slick Removing Vessel and issued to Larry D. Price, the inventor of the invention disclosed herein.

The invention disclosed in U.S. Pat. No. 3,630,376 provides a vessel which is especially equipped with means for removing oil and debris from the surface of the water. One embodiment of that invention comprises a barge having a relatively broad square bow portion, and a relatively flat hull. A holding chamber is positioned in the center portion of the vessel.

A pipe for carrying water is mounted in a horizontal position along the bow, and the pipe includes a series of slits or holes for permitting water under pressure to flow outwardly. The pipe is adjusted to be positioned below the surface of the water. A baffle plate is hingedly mounted in a horizontal position along bow and is pivotably movable about a horizontal axis. The water under pressure is forced out of the holes to create a wave or ripple which is forced over the top of baffle plate. The size of the wave depends on, the pressure created by pump, the size of apertures and the depth that pipe is under the surface of the body of water. The wave is adjusted to be sufficiently high such that a sheet of water carrying oil or debris goes over the top of the baffle plate.

When the vessel is propelled forward, the wave of water goes over the top of the baffle plate into the holding chamber. As the sheet of water and oil moves over the baffle plate, the mass of oil on the surface of water is caused to move smoothly over the top of the baffle plate onto the holding chamber. The oil can then be removed from the holding chamber by any one of various known methods.

SUMMARY OF INVENTION

The invention comprises an apparatus for use such as on a vessel such as a boat or a barge used on a body of water such as a lake or pond, for collecting and removing oil and debris floating on the surface of the water. A pipe provides water under pressure along a horizontal line beneath the surface of the water to form an upwardly directed wave on the surface of the water to carry water, oil and debris over an elongated baffle plate. The baffle plate has one edge positioned in abutting relation with the length of the pipe, and the other edge of the baffle plate extends upwardly at an angle. The baffle plate is positioned to control the portion of the wave which is allowed to flow over the plate into the boat. The pipe is adjustable vertically to further control the movement of the water over the baffle plate.

One end of an open mesh conveyor is positioned adjacent the baffle plate to receive the wave of water and debris it carries. The water freely flows through the conveyor, and the debris remains on the conveyor and is carried upwardly to a collection area.

The foregoing features and advantages of the present invention will be apparent from the following more particular description of the invention. The accompanying drawings listed hereinbelow are useful in explaining the invention wherein:

DESCRIPTION OF THE DRAWINGS

FIG. 1 is an isometric view of one embodiment of the inventive vessel;

FIG. 2 is a plan view of the pressure pipe, the baffle plate, the pivot weir and the structure for monitoring these units on the vessel of FIG. 1;

FIG. 3 is an isometric view of the pressure pipe, baffle plate and pivot weir assembly;

FIG. 3A is a view essentially in cross section of the pressure pipe, baffle plate and pivot weir;

FIG. 4 is a view partly in cross section showing a second power means for positioning the baffle plate and pivot weir and showing the lower end of the conveyor, and, FIG. 5(a) and 5(b) are sketches useful in explaining an important concept of the present invention, and comparing the invention with the prior art.

DESCRIPTION OF INVENTION

Referring to the drawings, and initially to FIG. 1, in one embodiment, the inventive apparatus is mounted on a vessel 11 in the form of a boat having two pontoons 12 and 13. The pontoon construction enables the vessel to have a relatively broad square bow portion, and a relatively flat hull. Suitable motors 15 may be affixed to the stern of the vessel 11 for propulsion. A deck 16 is suitably positioned over the mid portion of the vessel. A conveyor 18 extends at an upward angle from the bow toward the stern. A portion of the center part of the deck 16 is cut-out as at 17 to accommodate the conveyor 18. The rear end of conveyor 18 extends vertically above the deck 16 such that any matter carried upwardly along the conveyor can then drop onto the deck or onto a container positioned on the deck. The conveyor 18 is of an open mesh construction 19 to permit fluid (water) to flow therethrough and to retain or support any debris such as weeds or plants carried upwardly onto the conveyor, as will be explained. Conveyor 18 also includes cross bars 21 to prevent any debris from sliding backwardly down the conveyor. A suitable motor and gear drive assembly 22 powers the conveyor in a clockwise direction as oriented in FIG. 1.

FIGS. 2 and 3 show a pressure pipe assembly 40 including a pressure pipe 24, a baffle plate 27 and a pivot weir 38 which will now be described. The pipe 24, made such as of metal or of rigid plastic, extends horizontally along the bow of the vessel for carrying water under pressure. A liquid and gas flocculated mixture under pressure, rather than water under pressure, may be utilized to provide additional buoyancy to the floating material.

The pressure pipe 24 includes apertures 26 such as slits, holes or nozzles cut, formed therein or attached thereon. A spray, stream or jet action is formed when water under pressure from a suitable pump, not shown, is coupled through two input pipes 47 and 47A, connected respectively to opposite ends of pipe 24. By providing water under pressure to both ends of pipe 24 a relative smooth and predictable uniform height to the spray or jet action is obtained. It has been found that if water is pumped into only one end of pressure pipe 24, an undesirable uneven spray, stream or jet action is obtained which spray is of low amplitude at the input end of pipe 24 and increases in amplitude toward the other end.

Suitable valves, not shown, for pipes 47 and 47A, may be provided to adjust the water and the water pressure provided through pipes 47 and 47A to the pressure pipe 24, and thus utilized to control the height of the wave 50 produced by the jet action of the pressure pipe 24. In the prior art embodiment as disclosed in the aforesaid patent, the baffle plate 27 angle as well as the position of the pressure pipe 24 has to be mechanically controlled to adjust the portion of the wave 50 allowed to pass over the baffle plate into the storage section of the vessel. In the present structure the water pressure can be easily, conveniently and finely adjusted to allow the desired portion of the wave 50 to pass over the baffle plate 27.

The foregoing pressure control is also of importance in that for emulsified oil the pump can be throttled down to provide a light jet action or stream so that the emulsion is not broken up and a lesser amount of total water needs to flow over the baffle plate into the storage area, and yet a relatively greater amount of oil may be more efficiently recovered.

As will be explained, pipe 24 is movable vertically and is also rotatable to a selected angle to direct the spray, stream or jet action in the direction desired to generate a selected size wave or ripple extending along the length of pipe 24 and rising upwardly from the surface of the water a selected distance.

Refer now to FIGS. 5(a) and 5(b) for an explanation of an important facet and feature of the present invention.

It should be stated at the outset that the theory of the effect and why the present inventive apparatus provides such a significant improvement over the prior art is not entirely understood.

An explanation will be given as is, best understood. Assume that an oil recovery operation is underway. The kinetic energy of the water under pressure coming through the slits of pipe 24 is the motivating force or energy available to do work. In the prior art structure of FIG. 5(b), this force or energy apparently was divided to act on the water above and below and behind pipe 24. Accordingly, in the structure shown in FIG. 5(b), the oil on the surface of the water and a certain amount of "desired" water (that is, water forward and above the pipe 24 which needs to be treated or processed) is caused to pass over the pipe 24 and the baffle plate 27. However, a large amount of "undesired" water (that is, water beneath and behind or aft of the pipe 24) moved under and around the pipe through passageway 49 and over the bulkhead 45 into the storage section of the vessel. The term "undesired" water is used to refer to the water which is not to be treated or processed. This has been found to reduce the effectiveness of the apparatus.

FIG. 5A shows the present inventive apparatus, wherein pipe 24 is positioned similarly as in FIG. 5(b). Importantly, however, in FIG. 5A pipe 24 is located adjacent the top of bulkhead 45 such that "undesired" water flow from beneath and aft of pipe 24 is blocked or sealed out. Accordingly, only the "desired" water from above and ahead of pipe 24 is caused to flow past pipe 24.

In one particular oil recovery operation, the prior art structure shown in FIG. 5(b) had a production rate of approximately 50 barrels/hour (bbl/hr.) of light crude oil. In a later recovery operation at the same location, the oil to be recovered was heavy viscous #5 oil. The prior structure of FIG. 5(b) was used and production was down about 60%, to 21 bbl/hr. In contrast, the invention structure has a production of 65 bbl/hr., in the viscous #5 oil compared to 21 bbl/hr. In other operating situations, the inventive structure provides a production rate of 180 bbl/hr. in contrast to 50 bbl/hr. with the prior art. It appears that the inventive structure allows all the water required to fill the void (caused by the jet action or stream of pipe 24), to come from the top surface water which is what is necessary to get the oil to move toward the vessel 11, note point A in FIGS. 5(a) and 5(b) for comparison. Apparently in the prior art structure of FIG. 5(b), water drawn from underneath the pipe 24 causes a redirection of surface water movement.

It seems that the increased velocity of water from the jet action causes a void (as at point A) which has to be filled. In the prior art, water apparently comes from underneath, the sides and aft of the pipe 24 to fill the void; and the pipe in FIG. 5(b) acts to restrict the surface water, thereby allowing more water to be drawn from below, the sides and aft of the pipe. In constrast, the inventive structure allows this void (at point A) to be filled only by the desired or top surface water.

In the prior art structure, there apparently is not enough surface water movement to overcome the surface tension of the oil; and apparently the water takes the path of least resistance, hence water is drawn from under the pressure pipe. It thus appears that in the inventive structure, all the energy is being used to develop the current of the surface water above the pressure pipe 24 to thereby overcome the surface tension and move the oil toward the vessel.

Another important advantage of the inventive structure is that it functions satisfactorily, to recover oil and debris, in congested areas, under docks and piers, and in slack water where forward movement of the associated vessel is restricted. That is, forward motion is not necessary for satisfactory operation of the inventive structure.

A rigid baffle plate 27, made such as of metal or suitable rigid plastic, extends along the length of pipe 24 and is constructed to fit around the pressure pipe 24, to allow the plate 27 to rotate about the pipe, see also FIG. 3A. The leading edge of the baffle plate 27 is positioned adjacent pipe 24 to assure only "desired" water is moved over the baffle plate 27. In one embodiment of the invention, the baffle plate 27 has its leading section 28 formed as a semi-circle to fit around pipe 24, and to have its trailing section 31 extending upwardly at an angle to select the desired amount of water, and the desired size of the wave flowing over the upper edge 31A of the baffle plate 27.

The baffle plate 27 is constructed such that it will not interfere with the water stream or spray from pressure pipe 24. Note that in FIG. 3A, the baffle plate 27 and pipe 24 are in abutting relation; alternatively, a gasket material may be used to form a seal therebetween.

The baffle plate 27 may be moved from one angle to a second angle either manually, as indicated in FIG. 2, or hydraulically as indicated in FIG. 4. As shown in FIG. 2, when the proper angle of the baffle plate 27 is obtained, the plate may be locked in that position such as by a bolt or rod 33 extending into holes 34 formed in the side walls 36 of the pressure pipe assembly 40. The size of the wave formed by the operation of pressure pipe 24 in combination with proper positioning of the baffle plate 27 will thus provide control of the movement of floating materials toward and over the baffle plate 27.

A pivot weir 38 extends along the length of the pipe 24. Pivot weir 38 may be fixed in pivoting relation to the edge 28 of baffle plate 27, and functions as a retainer to limit the movement of material flow under the pipe 24. Also, pivot weir 38 which pivots about an axis, which is essentially the longitudinal axis of pipe 24, is locked in position similarly as baffle plate 27, see FIGS. 2 and 4, to thereby direct the movement of the floating material upwardly toward the pressure pipe 24.

As clearly shown in FIGS. 2 and 4, the baffle plate 27 and the pivot weir 38 may be positioned at different angles to increase the flexibility of the structure.

The pressure pipe assembly 40 which, as mentioned above, includes the pressure pipe 24, the baffle plate 27 and the pivot weir 38, is located in operating position on the bow of the vessel 11, see FIG. 1. Vessel 11 includes spaced vertically extending C-shaped tracks 41 on its bow, see also FIG. 3. Shafts 42 extend outwardly from the walls 36 of assembly 40, and rollers 43 are mounted on the free ends of the shafts 42. Respective ones of the rollers 43 ride in the tracks 41, see FIG. 3. Hooks 45 are suitably mounted on the upper edges of the walls 36. The hooks 45 are engaged such as by suitable chain and pulley arrangements as indicated at 46 to lower the assembly 40 into position.

When the assembly 40 is to be placed in operation, the assembly is lowered to and supported at a position such that the pressure pipe 24 is slightly below the surface of the water. The water or a liquid and gaseous mixture which is pumped under pressure through the pipe, is forced through the apertures to form the wave or ripple 50, see FIG. 4. The size of the wave is adjusted by adjusting the depth of the pipe 24 under the surface of the water, the water pressure, the rotational angle of the pipe 24, and the angles of the baffle plate 27 and the pivot weir 38. Note, of course, that the speed of the vessel 11 moving through the water also has a major effect on the wave 50 which is developed. In total, wave 50 has a lifting effect on floating or semi-floating material, thus lifting the materials over the baffle plate 27 to cause the material to fall and be deposited on the moving conveyor 18.

As mentioned above, the positioning of pressure pipe 24 adjacent bulkhead 45, has a drawing or pulling effect on the material floating adjacent the assembly 40. The foregoing drawing or pulling effect permits the assembly 40 to remain stationary while yet pulling or drawing the floating material toward assembly 40. Heretofore, it has been necessary to continue to move the vessel 11 forward to provide the necessary wave or ripple effect to cause the floating materials to move over the baffle plate 27.

As mentioned above, after being carried over the baffle plate 27, the material is dropped onto conveyor 18 and carried upwardly to a collecting point. The flat perforated or open surface 19 of conveyor 18 permits the water to flow therethrough, but supports and carries the floating material from the bow towards the stern of the vessel 11.

While the invention has been particularly shown and described with reference to a preferred embodiment thereof, it will be understood by those skilled in the art, that various changes in form and details may be made therein without departing from the spirit and scope of the invention.

I claim:

1. An apparatus configured to be positioned substantially on the surface of a body of water for collecting and removing liquid and solid waste matter floating on the surface of said body of water, comprising, in combination, pressure pipe means for selectively providing water under pressure substantially along a horizontal line beneath the surface of the water to move liquid and solid waste matter from areas forward of said pipe means over said pipe means, an elongated member positioned to abut said pipe means along the length of said pipe means and extending downwardly therefrom, and water flow sealing means between said member and said pipe means whereby water flow from areas behind and beneath said pipe means tends to be blocked.

2. An apparatus as in claim 1, including a member extending upwardly relative to said pipe means along the length thereof for controlling water, liquid and matter passing over said apparatus.

3. An apparatus as in claim 2, including a weir extending downwardly into said body of water from said pipe means at an adjustable angle.

4. An apparatus configured to be positioned substantially on the surface of a body of water for collecting and removing liquid and solid waste matter floating on the surface of said body of water, comprising, in combination, pressure pipe means for selectively providing water under pressure substantially along a horizontal line beneath the surface of the water to move liquid and solid waste matter from areas forward of said pipe means over said pipe means, and a weir extending downwardly from said pipe means into said body of water at an adjustable angle tending to block water flow from beneath and behind said pipe means.

* * * * *